United States Patent
Jeon

(10) Patent No.: US 11,205,291 B2
(45) Date of Patent: Dec. 21, 2021

(54) SYSTEMS AND METHODS FOR EFFICIENT MANAGEMENT AND MODIFICATION OF IMAGES

(71) Applicant: COUPANG CORP., Seoul (KR)

(72) Inventor: Han Sem Jeon, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/984,622

(22) Filed: Aug. 4, 2020

(65) Prior Publication Data

US 2020/0364916 A1 Nov. 19, 2020

Related U.S. Application Data

(63) Continuation of application No. 16/565,989, filed on Sep. 10, 2019, now Pat. No. 10,776,976, which is a continuation of application No. 16/378,923, filed on Apr. 9, 2019, now Pat. No. 10,445,915.

(51) Int. Cl.

| G06T 11/60 | (2006.01) |
|---|---|
| G06F 16/51 | (2019.01) |
| G06T 11/00 | (2006.01) |
| G06T 11/20 | (2006.01) |
| G06F 16/54 | (2019.01) |

(52) U.S. Cl.
CPC .............. G06T 11/60 (2013.01); G06F 16/51 (2019.01); G06F 16/54 (2019.01); G06T 11/001 (2013.01); G06T 11/203 (2013.01)

(58) Field of Classification Search
None
See application file for complete search history.

(56) References Cited

U.S. PATENT DOCUMENTS

| 7,418,131 B2 | 8/2008 | Wang et al. |
| 7,823,055 B2 | 10/2010 | Sull et al. |
| 7,979,340 B2 | 7/2011 | Korth et al. |
| 8,799,756 B2 | 8/2014 | Grosz et al. |
| 9,507,506 B2 | 11/2016 | Grosz et al. |

(Continued)

FOREIGN PATENT DOCUMENTS

| CN | 105427240 A | 3/2016 |
| CN | 107123084 A | 9/2017 |

(Continued)

OTHER PUBLICATIONS

Examination Report dated Dec. 3, 2020 in Australian Application No. 2020267143, 8 pages.

(Continued)

*Primary Examiner* — Vu Nguyen

(74) *Attorney, Agent, or Firm* — Finnegan, Henderson, Farabow, Garrett & Dunner LLP

(57) ABSTRACT

Methods and systems for efficient management and modification of images include receiving a first set of images from a seller system connected to the processor over the network interface; receiving an image sequence comprising references to the images in the first set of images and an order of appearance; storing the first set of images and the image sequence in the database; identifying one or more areas in the first set of images; removing the identified areas from the first set of images; and displaying the first set of images based on the image sequence.

18 Claims, 7 Drawing Sheets

(56) References Cited

U.S. PATENT DOCUMENTS

| | | |
|---|---|---|
| 2005/0091596 A1 | 4/2005 | Anthony |
| 2005/0129324 A1 | 6/2005 | Lemke |
| 2007/0078726 A1* | 4/2007 | MacDonald Korth ..................... G06Q 10/06 705/26.1 |
| 2008/0263449 A1 | 10/2008 | Schwartz |
| 2016/0139761 A1* | 5/2016 | Grosz ................... G06F 3/0482 715/769 |
| 2016/0154822 A1 | 6/2016 | Goswami et al. |
| 2017/0147867 A1* | 5/2017 | Pradeep .................. G06T 11/60 |
| 2018/0225736 A1 | 8/2018 | Lang et al. |

FOREIGN PATENT DOCUMENTS

| | | |
|---|---|---|
| JP | 2004-126637 | 4/2004 |
| JP | 2006-134230 | 5/2006 |
| JP | 2010-055452 | 3/2010 |
| JP | 2013-089196 | 5/2013 |
| JP | 2016-206937 | 12/2016 |
| JP | 2017-182472 | 10/2017 |
| KR | 10-2017-0104307 | 9/2017 |
| KR | 10-2017-0104312 | 9/2017 |
| KR | 10-1803006 | 11/2017 |
| TW | 200525273 | 8/2005 |
| WO | WO 2008/117827 A1 | 10/2008 |
| WO | WO 2017/002505 A1 | 1/2017 |

OTHER PUBLICATIONS

Office Action dated Dec. 16, 2020, by the Taiwanese Intellectual Property Office in Taiwanese Patent Application No. 109111673, 16 pages.
International Search Report and Written Opinion dated Jul. 21, 2020, in PCT Application No. PCT/IB2020/053047, 10 pages.
Office Action dated Jun. 15, 2021, from the Japanese Patent Office in Japanese Patent Application No. 2020-537718, 18 pages.
Examination Notice dated Jun. 23, 2021, from the Hong Kong Patent Office in Hong Kong Application No. 22020005338.1, 4 pages.
Office Action dated Mar. 12, 2021, by the Korean Patent Office in Korean Patent Application No. 10-2019-0069488, 8 pages.
Office Action dated Jul. 30, 2021, by the Taiwanese Intellectual Property Office in counterpart Taiwanese Patent Application No. 110119596, 15 pages.
"Just List It," Youtube, retrieved from Internet at https://www.youtube.com/watch?v=x3cJT_uOuQw, p. 1, dated Dec. 21, 2018.

* cited by examiner

Home > Cosmetics > Skin moisturizing > Infant Skin Care

Daily Moisture Lotion
3,379 reviews

11,490 won (325 won per 10-ml)

Tomorrow (Wed) 3/20

Capacity per piece x Quantity 354ml x 1

◉ One-off purchase  11,490 won
             (325 won per 10ml)

○ Subscribe 10,916 won
             (308 won per 10ml)

| 1 | Add to cart | Buy now |

Product Details | Reviews (3,370) | Contact Us | Shipping & Returns

Features
- Lotion
- Formulated with oatmeal and dimethicone Helps skin moisturize
- Practical with moisturizing function to maintain skin moisture for a long time
- Hygienic and convenient use and management by pump type

*FIG. 2*

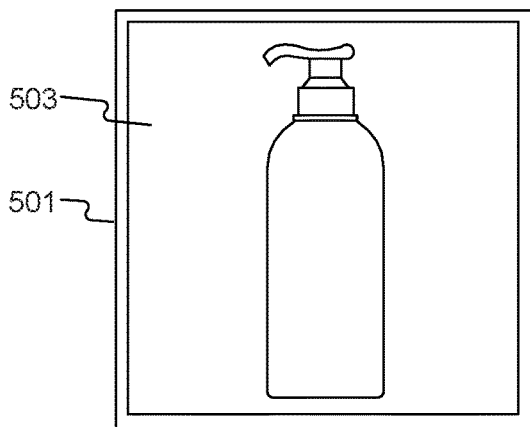
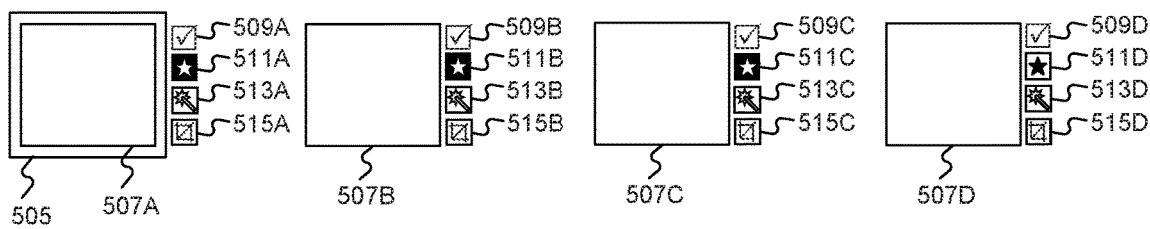
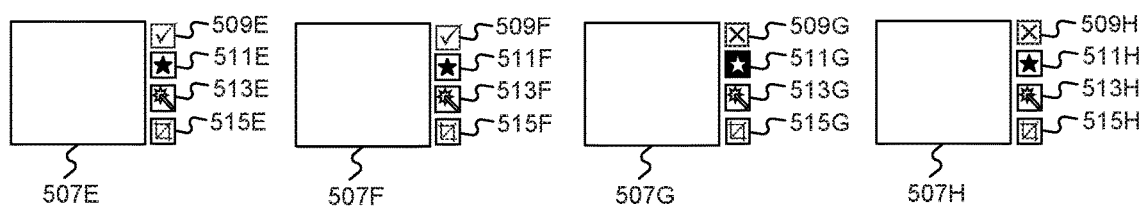
FIG. 5

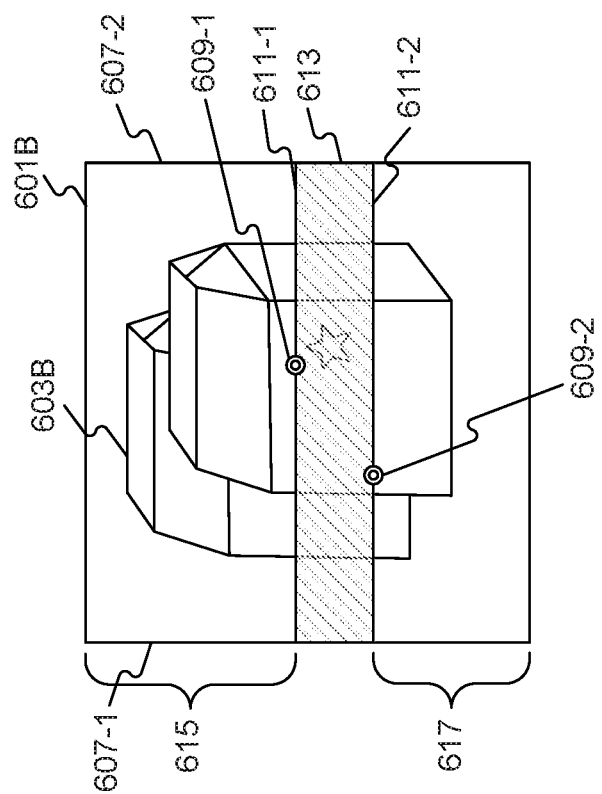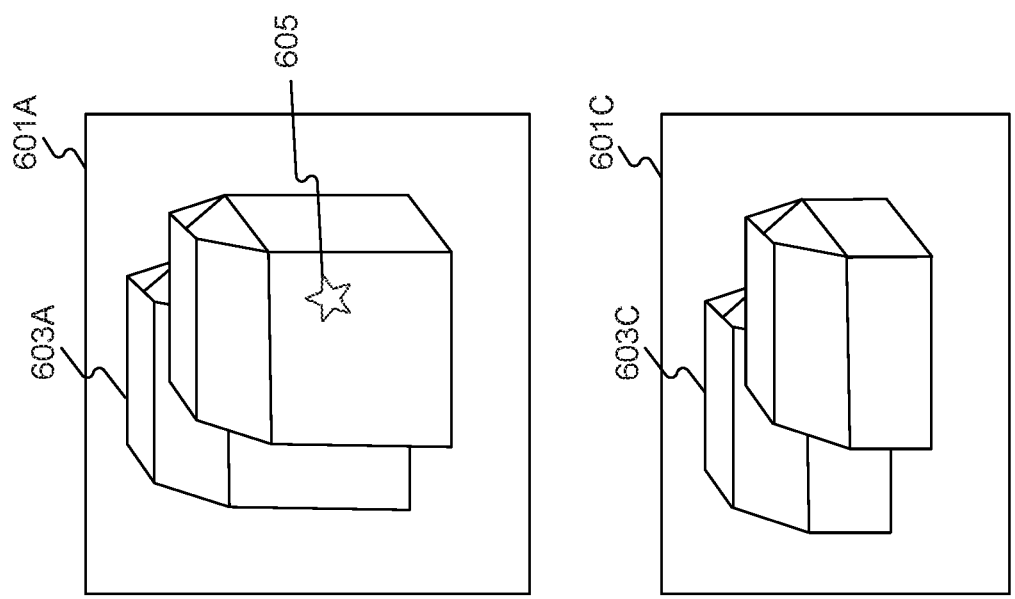
FIG. 6

SYSTEMS AND METHODS FOR EFFICIENT MANAGEMENT AND MODIFICATION OF IMAGES

RELATED APPLICATIONS

This application is a continuation of U.S. patent application Ser. No. 16/565,989 (now allowed) filed on Sep. 10, 2019, which is a continuation of U.S. patent application Ser. No. 16/378,923 (now U.S. Pat. No. 10,445,915) filed on Apr. 9, 2019, which is hereby incorporated by reference in the present application.

TECHNICAL FIELD

The present disclosure generally relates to computerized systems and methods for efficient management and modification of images. In particular, embodiments of the present disclosure relate to inventive and unconventional systems that manage images of products submitted by multiple vendors and provide a streamlined process for reviewing, verifying, and displaying the images while maintaining a consistent quality among the images.

BACKGROUND

With the advancement and proliferation of computer technology, online shopping, also known as e-commerce, has become one of the major avenues of commerce. Consumers and businesses purchase goods from online vendors more frequently than ever, and the number of transactions and sales revenue are projected to grow year-over-year at a staggering rate.

A recent trend in e-commerce involves hosting companies with a centralized server hosting an e-marketplace where vendors (both third-party and the hosting company itself) can list their products for sale and customers can browse and buy. Some of these hosting companies also have a network of warehouses or distribution centers where the vendors can stock their products so that they can be shipped out quickly from the warehouse once a customer places an order.

Listing a product on the e-marketplace involves submitting information of the product to the hosting company, which includes product images, descriptions, price, etc. The initial responsibility of maintaining the quality and appropriateness of the product information falls on the individual vendors. However, low quality or inappropriate contents may get published on the e-marketplace in the absence of adequate quality control. Moreover, an increasing number of vendors are providing descriptions in an image format, comprising customized marketing materials such as graphical elements, fonts, or graphs. These description images may come in a variety of aspect ratios, margins, and formats, all of which must be reviewed before they can be published on the e-marketplace for consistency among different products or compatibility to the hosting company's system. Other problems with product images include low quality or unnecessarily large images or offensive contents. These problems can lead to lower customer experience, ineffective marketing, or even liability issues not only for the vendor but also for the hosting company.

Currently existing solutions require manual review of individual images. This can be both slow and expensive for the hosting company as the number of different products and vendors increases, especially when each vendor has their own process of preparing the images. Increasing costs of reviewing product information must be absorbed by the hosting company or passed onto individual vendors or customers. Therefore, an automated system and method of managing product images are needed, where inappropriate images can be identified, removed, and/or modified.

SUMMARY

One aspect of the present disclosure is directed to a system for efficient management and modification of images. The system comprises: a memory storing instructions; a database; and at least one processor connected to the database. The processor is configured to execute the instructions for: receiving a first set of images from a seller system connected to the processor over the network interface; receiving an image sequence comprising references to the images in the first set of images and an order of appearance; storing the first set of images and the image sequence in the database; identifying one or more areas in the first set of images; removing the identified areas from the first set of images; and displaying the first set of images based on the image sequence.

Yet another aspect of the present disclosure is directed to a computer-implemented method for efficient management and modification of images. The method is performed by at least one processor connected to a computer system through a network interface and a database connected to the processor. The method comprises steps for: receiving a first set of images from a seller system connected to the processor over the network interface; receiving an image sequence comprising references to the images in the first set of images and an order of appearance; storing the first set of images and the image sequence in the database; identifying one or more areas in the first set of images; removing the identified areas from the first set of images; and displaying the first set of images based on the image sequence.

Yet another aspect of the present disclosure is directed to a system for efficient management and modification of images. The system comprises a memory storing instructions; a database; and at least one processor connected to the database. The processor is configured to execute the instructions for: receiving a first set of images from a seller system connected to the processor over the network interface; receiving an image sequence comprising references to the images in the first set of images and an order of appearance; storing the first set of images and the image sequence in the database; and identifying one or more areas in the first set of images. Identifying one or more areas comprises steps for: receiving a first selection of a first position in an image of the first set of images; receiving a second selection of a second position in the image, the first position and the second position being different from each other; analyzing pixels surrounding the first position or the second position, the pixels comprising a portion of the image within a predetermined distance from the first position or the second position; identifying a boundary line within the portion; moving the first position or the second position to the boundary line so that the boundary line falls within the area; displaying a first line extending from a first boundary of the image to a second boundary of the image through the first position, wherein the first line extends in a first direction that is parallel to a length or a width of the image, and wherein the first boundary and the second boundary are on opposite sides of the image; displaying a second line extending in the first direction from the first boundary to the second boundary through the second position; and selecting a first undesired area of the image between the first line and the second line, wherein the first undesired area extends in the first direction from the first boundary to the second boundary, and wherein the first undesired area extends in a second direction orthogonal to the first direction between the first line and the second line. The processor is further configured to execute the instructions for: removing the identified areas from the first set of images, wherein removing the identified areas comprises: removing the first undesired area from the image to form a first empty area; adjusting a first size of the first empty area in the second direction to form a first reduced empty area; determining a first color based on a first set of pixels near the first position; determining a second color based on a second set of pixels near the second position; and filling the first reduced adjusted area with a gradient based on the first color and the second color. Lastly, the processor is further configured to execute the instructions for displaying the first set of images based on the image sequence.

Other systems, methods, and computer-readable media are also discussed herein.

BRIEF DESCRIPTION OF THE DRAWINGS

FIG. 2 depicts a sample product page for a particular product and corresponding product information with interactive user interface (UI) elements, consistent with the disclosed embodiments.

FIG. 5 depicts a sample image management tool for a particular product for managing corresponding product information and submitted images with interactive UI elements, consistent with the disclosed embodiments.

FIG. 6 depicts an exemplary process of single-cropping an image, consistent with the disclosed embodiments.

DETAILED DESCRIPTION

Figure 1:
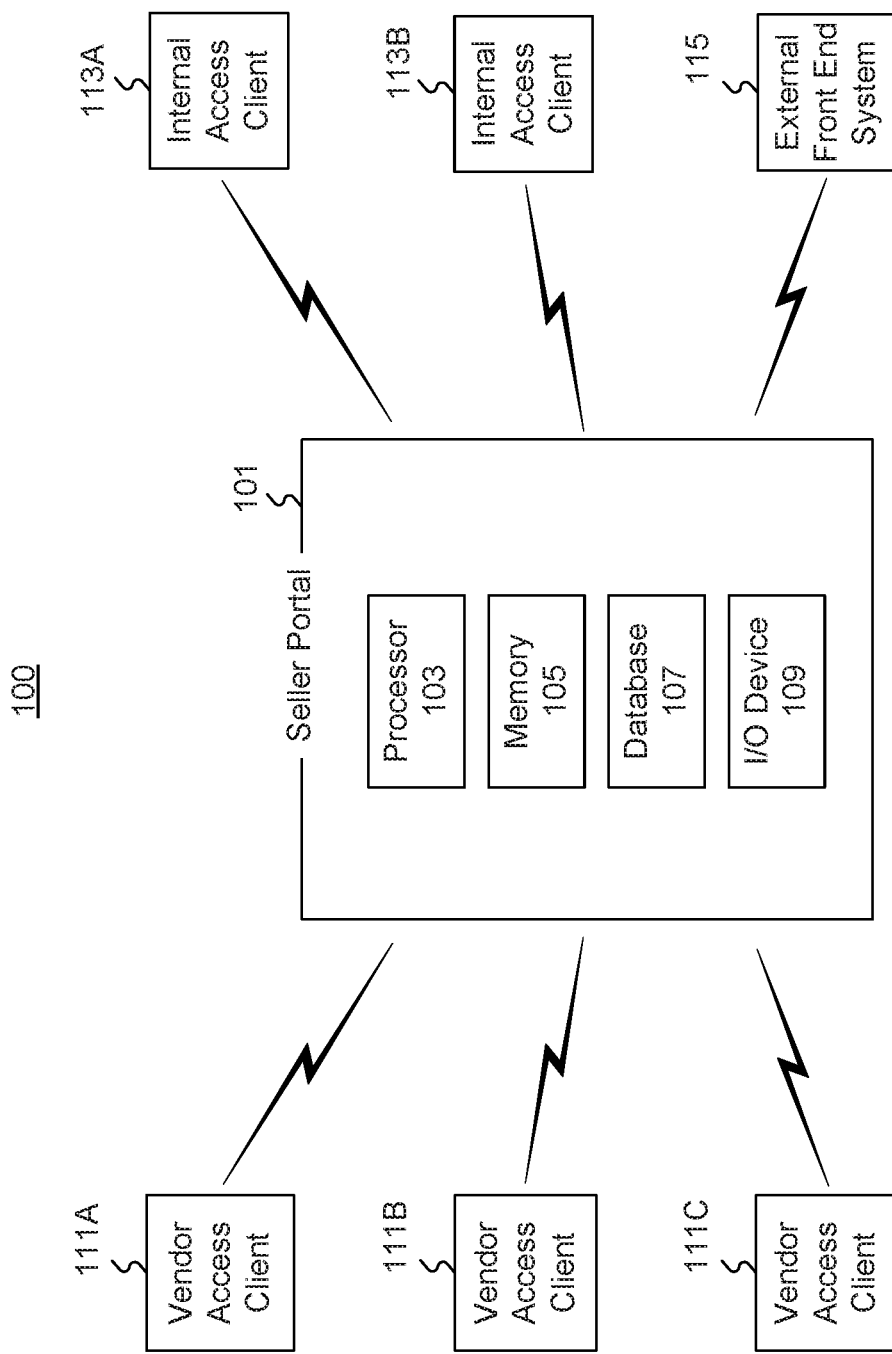
FIG. 1 is a schematic block diagram illustrating an exemplary embodiment of a network comprising computerized systems for receiving, managing, and displaying product information, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for efficient management and modification of images.

Referring to FIG. 1, a schematic block diagram illustrating an exemplary embodiment of a system 100 comprising computerized systems for communications enabling collection, management, and publication of images is shown. As illustrated in FIG. 1, system 100 may include a variety of systems, each of which may be connected to one another via one or more networks (not shown).

The depicted systems include seller portal 101; vendor access clients 111A, 111B, and 111C; internal access clients 113A and 113B; and external front end system 115. The one or more networks through which seller portal 101, vendor access clients 111A-C, internal access clients 113A-B, and external front end system 115 connect may be one or more public or private communication network. For example, networks may include any combination of any number of the Internet, an Intranet, a Local-Area Network (LAN), a Wide-Area Network (WAN), a Metropolitan-Area Network (MAN), a virtual private network (VPN), a wireless network (e.g., compliant with the IEEE 802.11a/b/g/n), a wired network, a leased line, a cellular data network, and a network using Bluetooth connections, infrared connections, or Near-Field Communication (NFC) connections. The systems may also be connected to one another via a direct connection, for example, using a cable.

Seller portal 101, in some embodiments, may be implemented as a computer system (e.g., one or more computers) that receives product information comprising product images, descriptions, price, shipping information, vendor information, etc. Product descriptions may be both textual and graphical. Seller portal 101 may allow an internal user (e.g., employees of an organization that owns, operates, or leases seller portal 101), via internal access clients 113A-B, to access the product information, make modifications, communicate with corresponding third-party vendors at vendor access clients 111A-C, and approve a product for display on a webpage via external front end system 115, where external users (e.g., customers) may view and place purchase orders. An internal user may also access seller portal 101 to submit product information for its own products instead of those sold by third-party vendors. As used herein, the term vendor may include both a third-party vendor and an internal user submitting product information for its own products.

In some embodiments, seller portal 101 may comprise a processor 103; memory 105 storing computer-readable instructions; database 107 for storing product information; and I/O device 109 for receiving user input and providing output to the user. Seller portal 101 may be implemented as a web user interface that receives instructions from an internal user to perform its functions. For example, seller portal 101 may be implemented as a computer or computers running software such as the Apache HTTP Server, Microsoft Internet Information Services (IIS), NGINX, or the like.

Processor 103 may be a generic or specific electronic device capable of manipulating or processing information. For example, processor 103 may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type of circuit capable of data processing. Processor 103 may also be a virtual processor that includes one or more processors distributed across multiple machines or devices coupled via a network.

Memory 105 may be a generic or specific electronic device capable of storing codes and data accessible by processor 103 (e.g., via a bus, not shown). For example, memory 105 may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. Memory 105 may also be a virtual memory that includes one or more memories distributed across multiple machines or devices coupled via a network.

Database 107 may be implemented in software, hardware, or a combination of the two. Database 107 also be a generic or specific electronic device capable of storing data accessible by processor 103 (e.g., via a bus, not shown). For example, database 107 may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. Database 107 may also include one or more storage devices distributed across multiple machines or devices coupled via a network. Database 107 may store product information provided by vendors via vendor access clients 111A-C or internal access clients 113A-B. Database 107 may also allow access by internal users, via internal access clients 113A-B, to view, modify, or approve the product information. Database 107 may also provide the product information to external front end system 115 for display on a webpage, which external users can access.

I/O device 109 may comprise one or more input/output devices that allow data to be received and/or transmitted by seller portal 101. For example, I/O device 109 may include one or more input devices, such as a network connection, keyboard, touch screen, mouse, microphone, and the like, that enable data to be input or received from a user. Further, I/O device 109 may include one or more output devices, such as a network connection, display screen, printer, speaker devices, and the like, that enable data to be output or presented to a user.

In some embodiments, vendor access clients 111A-C may be implemented as individual computer systems that enable third-party vendors to interact with one or more systems in system 100. For example, a third-party vendor wishing to sell a product through system 100 may access seller portal 101 via a vendor access client located at the vendor's facility and provide product information comprising name, price, shipping information, product images, and detailed description in an image format. When more than one images are provided as part of the product information, the vendor may also provide the sequence in which the images should appear, wherein the sequence may include references to the images stored in database 107. Vendor access clients 111A-C may be implemented as any combination of any number of any type of computers, such as a general-purpose computer, a special-purpose computer, a personal computer, a laptop, a tablet, a cellphone, a smartphone, or a cloud computer. In some embodiments, vendor access clients 111A-B may comprise one or more input devices such as a network connection, keyboard, touch screen, mouse, or the like, that allows a third-party vendor to provide an input to the seller portal 101.

In some embodiments, internal access clients 113A-B may be implemented as individual computer systems that enable internal users to interact with one or more systems in system 100. For example, an internal user, wishing to view, manipulate, and approve product information may access seller portal 101 via an internal access client 113A or B. Internal access clients 113A-B may be located at the same facility as seller portal 101 or at a remote location. Internal access clients 113A-B may be implemented as any combination of any number of any type of computers, such as a general-purpose computer, a special-purpose computer, a personal computer, a laptop, a tablet, a cellphone, a smartphone, or a cloud computer. In some embodiments, internal access clients 113A-B may comprise one or more input devices such as a network connection, keyboard, touch screen, mouse, or the like, that allows an internal user to provide an input to the seller portal 101.

In some embodiments, seller portal 101 may identify, based on instruction from an internal user via internal access clients 113A-B, or determination by an image recognition algorithm, a subset of images that may be inappropriate for display on a webpage. The inappropriate images may be identified based on their respective resolution (e.g., images that are too large to be displayed or too small to see), quality (e.g., images that are too noisy), or contents (e.g., images with offensive or prohibited contents). Seller portal 101 may remove the inappropriate images from database 107 and create notifications to corresponding vendors via corresponding vendor access client to resubmit the images. Once a set of replacement images are submitted by the vendors, seller portal 101 may reverify the replacement images for compliance to a predetermined set of criteria (e.g., size, resolution, content, age-limit, etc.) and reject or accept the replacement images. Such verification may be performed by an internal user via internal access client 113A-B or by an image recognition algorithm.

At each point in time where a subset of images is removed or replaced in database 107, the sequence in which the images should appear may need to be updated to remove empty references to images no longer in database 107 or update the references to the replacement images. In this case, seller portal 101 may iterate through the references in the sequence to identify an empty reference to an image removed from database 107, display a notification to an internal user that an invalid (i.e., empty) reference was found, and remove the reference from the sequence. In some embodiments, seller portal 101 may also update old references in the sequence to reference replacement images newly accepted as described above.

In some embodiments, external front end system 115 may be implemented as a computer system that enables external users to interact with one or more systems in system 100. For example, in embodiments where seller portal 101 enables the display of products on a webpage to enable external users to place an order for a product, external front end system 115 may be implemented as a web server that receives search requests, presents product pages, and solicits payment information. For example, external front end system 115 may be implemented as a computer or computers running software such as the Apache HTTP Server, Microsoft Internet Information Services (IIS), NGINX, or the like. In other embodiments, external front end system 115 may run custom web server software designed to receive and process requests from external devices (e.g., mobile device or computer), acquire information from databases and other data stores based on those requests, and provide responses to the received requests based on acquired information.

In some embodiments, external front end system 115 may include one or more of a web caching system, a database, a search system, or a payment system. In one aspect, external front end system 115 may comprise one or more of these systems, while in another aspect, external front end system 115 may comprise interfaces (e.g., server-to-server, database-to-database, or other network connections) connected to one or more of these systems.

Referring to FIG. 2, a sample product page 200 that includes a product and corresponding product information with interactive UI elements is shown. In some embodiments, seller portal 101 may manage and provide product information for display in product page 200, and external front end system 115 may organize and display the product information from seller portal 101 on a webpage displaying one or more product pages. All product information may be stored in database 107.

In some embodiments, product page 200 may include product image pane 201, ordering pane 203, navigational menu pane 205, and textual description pane 207. The layout of the different elements of product page 200 shown in FIG. 2 is presented only for the purposes of illustration, and different layouts comprising different combinations of one or more UI elements and/or additional UI elements are within the scope of the present disclosure. Furthermore, boundaries of individual UI elements of product page 200 such as product image pane 201, ordering pane 203, navigational menu pane 205, and textual description pane 207 are depicted with dotted lines only for illustrative purposes. The boundaries may or may not be visible to external users viewing product page 200 on a webpage.

In some embodiments, product image pane 201 may include one or more product images 209A, 209B, and 209C of a product (e.g., daily moisture lotion). The specific number of images is not critical to the invention, and greater or fewer number of images may be presented. Product images 209A-C may be those provided by a third-party vendor via vendor access clients 111A-C or those provided by an internal user via internal access clients 113A-B, and approved for display by an internal user via internal access clients 113A-B and seller portal 101. Product image pane 201 may further include a main image pane 211 for displaying one of product images 209A-C based on an external user's (e.g., a customer) selection. In the sample product page 200, product image 209A is the selected image as marked by the double frame surrounding product image 209A and is displayed in the main image pane 211. The method of marking a selected image is not limited to displaying a double frame as in FIG. 2, and other suitable means would be obvious to one of ordinary skill in the art. Moreover, an external user may select an image for display on main image pane 211 by, for example, hovering a mouse cursor over the desired image with a cursor, clicking the desired image, etc.

In some embodiments, ordering pane 203 may include textual information of the product such as the name, the price, the delivery information, or the like. In some embodiments, ordering pane 203 may also include UI elements that receive an external user's selection of desired ordering or shipping options as illustrated in FIG. 2.

In some embodiments, navigational menu pane 205 may include different UI elements such as a series of tabs or buttons for displaying different information. For example, navigational menu pane 205 may comprise tabs or buttons for displaying detailed product description, reviews, vendor contact information, and shipping and return information as illustrated in FIG. 2.

Figure 3:
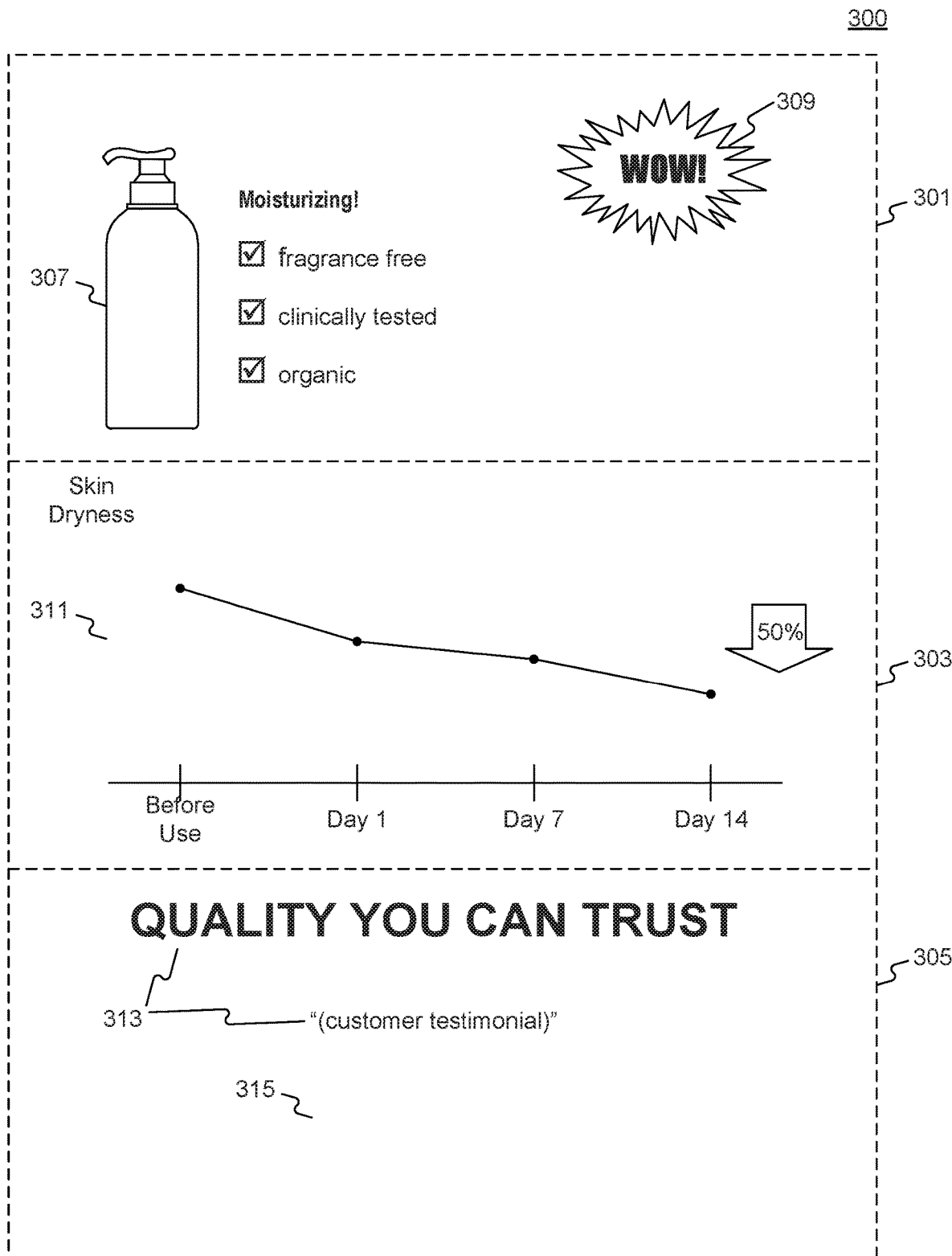
FIG. 3 depicts a sample graphical description pane that includes images for product description, consistent with the disclosed embodiments.

In some embodiments, textual description pane 207 may include textual information of the product such as its contents, functions, and/or instructions for use. In other embodiments, textual description pane 207 may be substituted or supplemented by graphical description pane 300 as illustrated in FIG. 3. The information in textual description pane 207 and graphical description pane 300 may be provided by a corresponding third-party vendor via vendor access clients 111A-C or by an internal user serving as a vendor via internal access client 113A-B. Textual description pane 207 may contain marketing material for the corresponding product prepared by the corresponding vendor.

Referring to FIG. 3, a sample graphical description pane 300 comprising graphical information is shown. Graphical description pane 300 may include, for example, description images 301, 303, and 305 as shown. Boundaries of description images 301-305 are depicted with dotted lines only for illustrative purposes. The boundaries may or may not be visible to external users viewing graphical description pane 300 on a webpage.

Description images 301-305 may be a subset of the images provided by a corresponding vendor via vendor access clients 111A-C or internal access clients 113A-B and approved for display by an internal user via internal access clients 113A-B using seller portal 101. Description images 301-305 may contain customized design elements such as one or more images of the corresponding product 307, one or more graphic elements 309, one or more graphs 311, and/or one or more marketing phrases 313. Description images 301-305 may also contain undesired elements such as a blank space 315.

Figure 4:
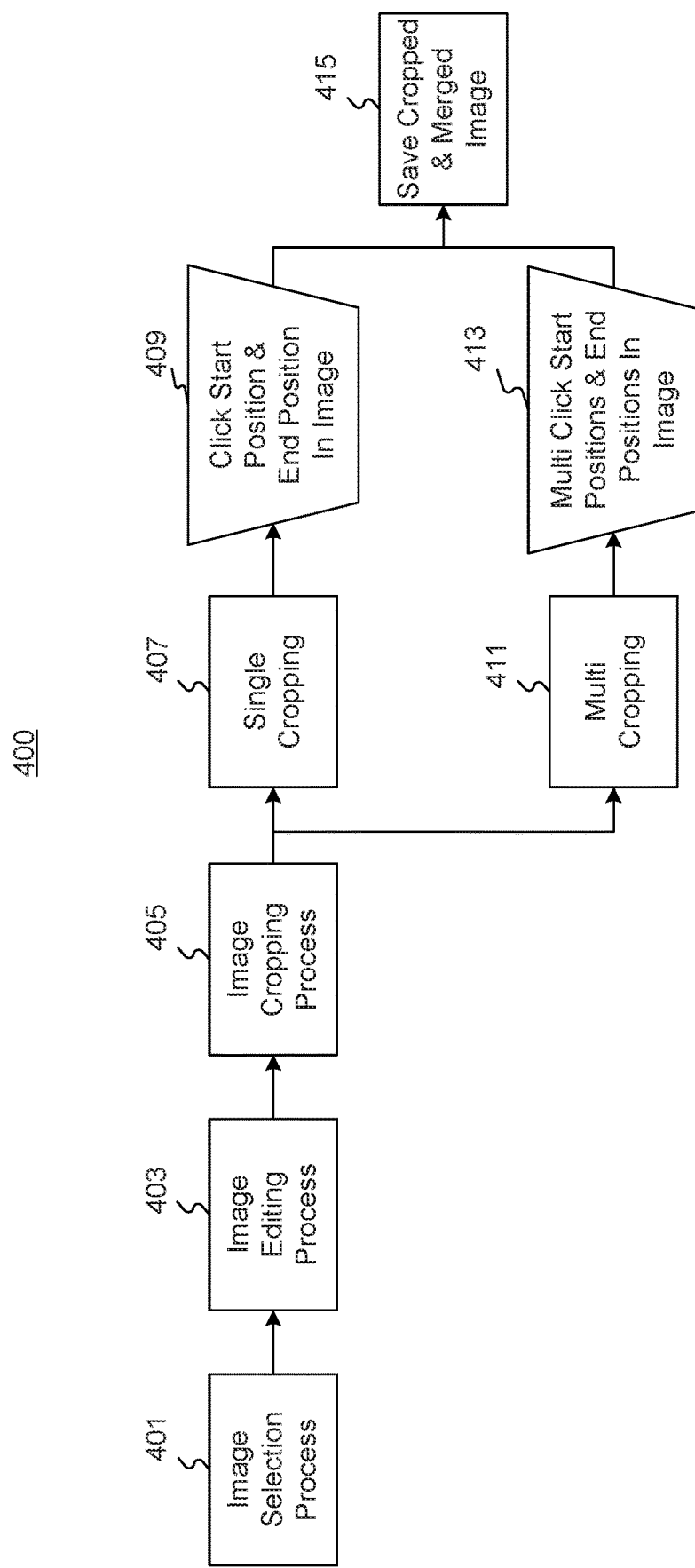
FIG. 4 is a flowchart of an exemplary computerized image adjustment process that is followed in order to review and modify product images and description images, consistent with the disclosed embodiments.

Referring to FIG. 4, a flowchart of an exemplary computerized image adjustment process 400 is shown. Elements of image adjustment process 400 will be described with reference to FIGS. 5-7. An internal user, via internal access clients 113A-B, may access product information stored in database 107 through seller portal 101. Although product information may include textual and logistical information about the corresponding product in addition to images of the product and its description (e.g., product images 209A-C and description images 301-305), image adjustment process 400 will be described with respect to the images only. In some embodiments, an internal user, via internal access clients 113A-B, may perform one or more stages of image adjustment process 400 on one or more images provided by a corresponding vendor. In some embodiments, one or more stages of image adjustment process 400 may be automated using an image recognition algorithm.

In some embodiments, image adjustment process 400 may comprise image selection process 401, which may be realized using image selection tool 500 illustrated in FIG. 5.

Image selection tool 500 is an exemplary user interface for browsing images provided by a third-party vendor, via vendor access clients 111A-C, or an internal user, via internal access clients 113A-B, for a product. The arrangement of UI elements and information in FIG. 5 are presented only for illustrative purposes. Image selection tool 500 may comprise, among others, a main product image pane 501 and a sequence of images (e.g., 507A-H). The sequence in which the images appear may be the sequence provided by the corresponding vendor. The sequence may also be the sequence in which the images appear on product page 200. The sequence may progress from the top left image and end with the bottom right image. The number of images presented in FIG. 5 is illustrative only, and a vendor may provide any number of images as desired including zero.

Main product image pane 501 may display one image representative of the product. Main product image 503 displayed in main product image pane 501 may be the default image displayed in product page 200 (e.g., the image displayed in main image pane 211). Among all of the images (e.g., 507A-H) provided by a vendor, the main product image 503 may be selected based on the product information provided via vendor access clients 111A-C or internal access clients 113A-B. Additionally in some embodiments, an internal user may change the main product image 503 to a different image by selecting the desired image among all of the images (e.g., 507A-H) provided by the vendor. In some embodiments, the image currently selected as the main product image 503 may be marked with a double frame (e.g., 505). Other ways of marking a selected image such as highlighting or marking a check box would be obvious to one of ordinary skill in the art and are within the scope of the current disclosure.

Each image (e.g., 507A-H) may be accompanied by one or more buttons, which may comprise publish button (e.g., 509A), product image button (e.g., 511A), image editing button (e.g., 513A), and image cropping button (e.g., 515A). Other buttons with similar reference numerals (e.g., 509A-H) serve substantially similar functions as their corresponding counterpart described below.

In some embodiments, a publish button (e.g., 509A) may be a toggle button that switches between a selected state illustrated by selected publish button 509A and a deselected state illustrated by deselected publish button 509G. An internal user may toggle between the two states of the publish button to differentiate between images that are approved for publication (e.g., 507A-F) and those that are not (e.g., 507G-H). In some embodiments, seller portal 101 may automatically move a particular image to the end of the sequence when an internal user toggles the publish button of the particular image from a selected state to a deselected state.

In some embodiments, a product image indicator button (e.g., 511A) may be a toggle button that switches between a selected state illustrated by selected product image indicator button (e.g., 511A) and a deselected state illustrated by deselected product image indicator button (e.g., 511D). An internal user may toggle between the two states of the product image indicator button to differentiate between product images (e.g., 507A-C and G) that should be displayed in product image pane 201 and description images (e.g., 507D-F and H) that should be displayed in graphical description pane 300.

In some embodiments, an internal user, via internal access clients 113A-B, may also rearrange images to change the order in which the images appear on a product page. For example, if product images 507A-C corresponded to product images 209A-C in FIG. 2, rearranging product image 507C to be on the left side of product image 507B (i.e., moving to an earlier position in the sequence) may prompt external front end system 115 to change product page 200 to display product image 209C above product image 209B. Similarly, if description images 507D-F corresponded to description images 301-305 in FIG. 3, rearranging description image 507D to be on the right side of description image 507F (i.e., moving to a later position in the sequence) may prompt external front end system 115 to change graphical description pane 300 to display description image 301 below description image 305.

In some embodiments, image editing button (e.g., 513A) may be configured to display an image editing tool (not shown) to perform image editing process 403 of FIG. 4. Image editing process 403 may be configured to allow an internal user to adjust properties of an image, such as its brightness, contrast, hue, and/or saturation. Image editing process 403 may also allow an internal user, via internal access clients 113A-B, to perform other well-known adjustments such as changing the resolution, filtering out noise, applying image effects, combining the image with another image, etc.

In some embodiments, image cropping button (e.g., 515A) may be configured to display an image cropping tool (not shown) to perform image cropping process 405 of FIG. 4. Image cropping process 405 may be configured to allow an internal user to remove an undesired feature of an image such as blank space 315 of FIG. 3. Referring back to FIG. 4, image cropping process 405 may comprise two cropping processes: single-cropping 407 and multi-cropping 411. In some embodiments, single-cropping 407 may be configured to remove one continuous block of space from an image, whereas multi-cropping 411 may be configured to remove more than one continuous blocks of space from an image.

Single-cropping 407 will be described with reference to exemplary single-cropping process 600 of FIG. 6. Referring to FIG. 6, an image 601A is shown with product 603A comprising undesired feature 605. Image 601A may be a product image or a description image. At step 409 of FIG. 4, an internal user may recognize undesired feature 605 and input start and end positions on image 601A. For example, the internal user may, using an input device (e.g., keyboard, mouse, or touchscreen) on internal access clients 113A-B, select (e.g., enter, click, or tap, respectively) the positions on image 601A. Such discrete selection of individual positions offers another advantage over prior systems. For example, prior system require clicking on a start position using a cursor and dragging the cursor to the end position. In this case, it may be difficult to select two positions in a click-and-drag motion on a long image. Instead with seller portal 101 and internal access client 113A-B, the internal user may select start position, scroll to the end position, and select the end position without having to juggle between holding the first selection and scrolling to the end position.

Referring back to FIG. 6 after the internal user has selected the start and end positions, seller portal 101 may receive a first selection of first position 609-1 and a second selection of second position 609-2. Seller portal 101 may then select undesired area 613 of image 601B by drawing first line 611-1 in a first direction from first boundary 607-1 of image 601B through first position 609-1 to second boundary 607-2 on the opposite side. A second line 611-2 may also be drawn in the first direction from first boundary 607-1 through the second position 609-2 to the other boundary 607-2. The first direction may be parallel to the length or the width of image 601B. Undesired area 613 may extend between first boundary 607-1 and second boundary 607-2 in the first direction and between first line 611-1 and second line 611-2 in a second direction orthogonal to the first direction.

In some embodiments, first boundary 607-1 and second boundary 607-2 may be the left and right boundaries of image 601B or top and bottom boundaries of image 601B. In some embodiments, lines 611-1 and 611-2 shown in image 601B may be horizontal, vertical, or slanted but may be orthogonal to both first boundary 607-1 and second boundary 607-2.

In some embodiments, all or part of the process described above may be automated using an image recognition algorithm. For example, seller portal 101 may be configured to identify, using an image recognition algorithm, suitable positions for first position 609-1 and second position 609-2 above and below an undesired feature and select undesired area 613 as described above. Alternatively, seller portal 101 may be configured to optimize the positions of first position 609-1 and/or second position 609-2 by analyzing pixels of image 601B within a predetermined distance from any of first position 609-1, second position 609-2, first line 611-1, second line 611-2. In some embodiments, seller portal 101 may identify, using an image recognition algorithm, a boundary line (e.g., boundary of the undesired feature 605 or boundary of another element in the image) and move first position 609-1 and/or second position 609-2 so that the boundary line falls inside undesired area 613 or outside as appropriate.

In some embodiments, seller portal 101 may also use an image recognition algorithm to identify the location of one or more undesired features (e.g., 605) such as an empty space and/or an inappropriate content and direct internal user's attention to the identified features. Seller portal 101 may also prompt the internal user to confirm that the identified feature is actually undesired by, for example, prompting the internal user to select the identified feature.

In some embodiments, the undesired feature may include an area of an image comprising a repetitive pattern or a continuous block of a color, which may indicate that the area is a background portion. In this case, seller portal 101 may select an area surrounding the undesired feature, where the area may extend in a first direction between the narrowest portion of the undesired feature and in a second direction orthogonal to the first direction between a first boundary and a second boundary of the image. The first direction may again be parallel to the length or the width of the image.

In some embodiments, seller portal 101 may remove undesired area 613 by cropping out the area. Cropping out an area may refer to removing pixels of image 601B that fall within undesired area 613, leaving first remaining area 615 on one side of undesired area 613 and second remaining area 617 on the other side of undesired area 613 intact. Next, seller portal 101 may bring first remaining area 615 and second remaining area 617 closer together in a first direction to merge them together into cropped image 601C. In some embodiments, a dimension of cropped image 601C may equal to the original dimension of image 601A minus the length of undesired area 613. The cropped image 601C may be saved to database 107 at step 415 of FIG. 4.

Alternatively, first remaining area 615 and second remaining area 617 may be brought closer together but not completely, leaving an adjusted empty area (not shown) between first remaining area 615 and second remaining area 617. An internal user may fill the adjusted empty area with a solid block of color (e.g., white). In some embodiments, seller portal 101 may fill the adjusted empty area with a gradient determined based on two colors determined using an image recognition algorithm. In this case, seller portal 101 may, for example, analyze pixels near first position 609-1 or first line 611-1 and determine a first color that matches or blends well with the pixels. Seller portal 101 may also analyze pixels near second position 609-2 or second line 611-2 and determine a second color that matches or blends well with the pixels. Seller portal 101 may then determine a gradient between the two color and fill the adjusted empty area with the determined gradient. In some embodiments, internal user may manually choose two colors for the gradient.

In some embodiments, the solid block of color or the gradient that fills the adjusted empty area is not limited to one block of a color or one gradient of two colors. Instead, seller portal 101 may use multiple colors or gradients. For example, seller portal 101 may analyze pixels near multiple points along first line 611-1 and second line 611-2 and fill the adjusted empty area with stripes of different colors and/or gradients to make the adjusted empty area less conspicuous between two remaining areas 615 and 617.

Still further, seller portal 101 may determine, using an image recognition algorithm, a content that matches or blends well with the contents near first position 609-1 and second position 609-2. For example, if the background area of image 601B (i.e., area outside of product 603B) was filled with a particular pattern and the area inside of product 603B was filled with another pattern, seller portal 101 may recognize the patterns and fill the adjusted empty area outside of product 603C with the particular pattern while filling the adjusted empty area inside of product 603C with the other pattern.

While image editing process 403 and image cropping process 405 are described above with respect to one image at a time, seller portal 101 may perform the processes automatically to a batch of images using an image recognition algorithm in some embodiments. In this case, seller portal 101 may prompt an internal user from time to time to confirm its determinations or allow the internal user to revert any changes made by the seller portal 101.

Image recognition algorithms used to recognize certain contents within images as described above may include any computer-vision algorithm for object recognition or pattern recognition, employing techniques such as fuzzy logic, neural network, machine learning, and deep learning. Such image recognition algorithm may be implemented as a software function within processor 103, using a dedicated processor, or using a network of processors dedicated to computer learning.

Referring back to FIG. 4, image cropping process 405 may comprise two cropping processes: single-cropping 407 and multi-cropping 411. In some embodiments, multi-cropping 411 may be configured to remove more than one continuous blocks of space from an image.

Figure 7:
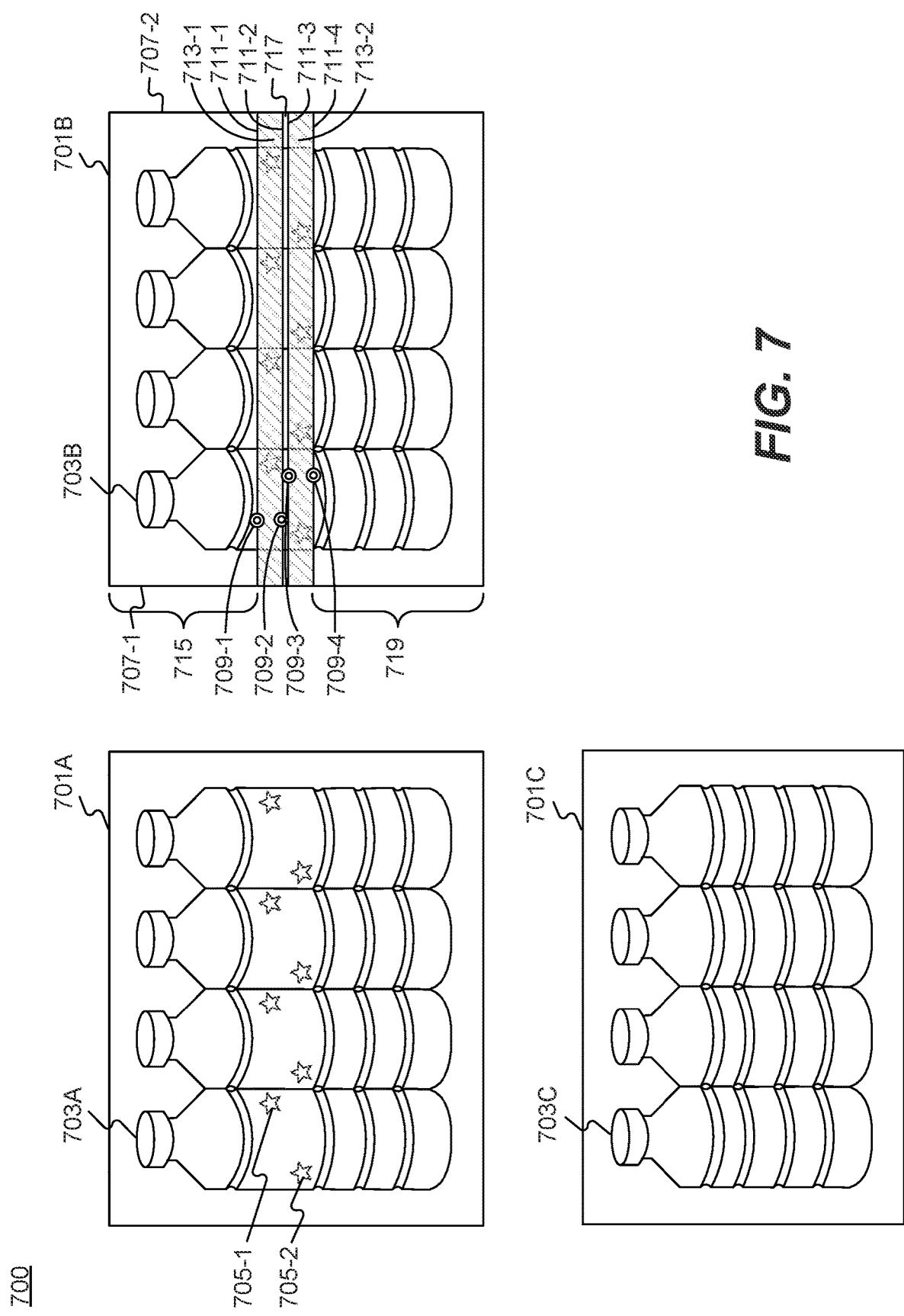
FIG. 7 depicts an exemplary process of multi-cropping an image, consistent with the disclosed embodiments.

Multi-cropping 411 will be described with reference to exemplary multi-cropping process 700 of FIG. 7. Referring to FIG. 7, an image 701A is shown with products 703A comprising undesired features 705-1 and 705-2. Image 703A may be a product image or a description image. Multi-cropping 411 may be similar to single-cropping 407 in that it also involves receiving selections of a first position and a second position and removing the area between the two positions.

At step 413 of FIG. 4, an internal user may recognize undesired features 705-1 and 705-2 and click on start and end positions on image 701A. In response, seller portal 101 may receive selections of first position 709-1, second position 709-2, third position 709-3, and fourth position 709-4. Seller portal may then select undesired areas 713-1 and 713-2 of image 701B by drawing first line 711-1 in a first direction from first boundary 707-1 of image 701B through first position 709-1 to second boundary 707-2 on the opposite side. Second line 711-2, third line 711-3, and fourth line 711-4 may also be drawn in the first direction in a similar manner. The first direction may again be parallel to the length or the width of image 701B as described above. Undesired area 713-1 may extend between first boundary 707-1 and second boundary 707-2 in the first direction and between first line 711-1 and second line 711-2 in a second direction orthogonal to the first direction. Undesired area 713-2 may also extend between first boundary 707-1 and second boundary 707-2 in the first direction and between third line 711-3 and fourth line 711-4 in a second direction.

Number of positions received from the internal user for multi-cropping is not limited to four and may be any multiple of two (i.e., $2n$ number of positions). In these cases, seller portal 101 may display corresponding number of lines (i.e., 2n number of lines), select corresponding number of undesired areas (i.e., n number of undesired areas), and merge corresponding number of remaining areas (i.e., n+1 number of remaining areas).

In some embodiments, first boundary 707-1 and second boundary 707-2 may be the left and right boundaries of image 701B or top and bottom boundaries of image 701B. In some embodiments, lines 711-1 through 711-4 shown in image 701B may be horizontal, vertical, or slanted but may be orthogonal to both first boundary 707-1 and second boundary 707-2.

In some embodiments, all or part of the process described above may also be automated using an image recognition algorithm as is the case for single-cropping.

In some embodiments, seller portal 101 may remove undesired areas 713-1 and 713-2 by cropping out the areas as described above with respect to cropping out undesired area 613. Cropping out an area may refer to removing pixels of image 701B that fall within undesired areas 713-1 and 713-2, leaving first remaining area 715 on one side of undesired area 713-1, second remaining area 717 between undesired areas 713-1 and 713-2, and third remaining area 719 on the other side of undesired area 713-2. Next, seller portal 101 may bring first remaining area 715, second remaining area 717, and third remaining area 719 closer together in a first direction to merge them together into cropped image 701C. In some embodiments, a dimension of cropped image 701C may equal to the original dimension of image 701A minus the length of undesired area 713-1 and that of undesired area 713-2. The cropped image 701C may be saved to database 107 at step 415 of FIG. 4.

Alternatively, any pair of neighboring remaining areas (e.g., first remaining area 715 and second remaining area 717, but not first remaining area 715 and third remaining area 719) may be brought closer together but not completely, leaving one or more adjusted empty area (not shown) between the two neighboring remaining areas brought closer together. An internal user or seller portal 101 using an image recognition algorithm may fill the adjusted empty areas in a manner similar to filling the adjusted empty area during single-cropping as described above.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for efficient management and modification of images, the system comprising:
    a database comprising a set of images associated with a plurality of products;
    at least one non-transitory computer-readable medium configured to store instructions; and
    at least one processor configured to execute the instructions to perform operations comprising:
        receiving one or more product data comprising an image sequence for displaying the set of images;
        removing a first subset of images from the image sequence by:
            iterating through one or more references to the set of images in the image sequence;
            identifying one or more empty references corresponding to the first subset of images;
            displaying a notification that the empty references are found; and
            removing the empty references in the image sequence; and
        making the set of images accessible by a plurality of networked systems according to the one or more product data.

2. The computer-implemented system of claim 1, wherein the operations further comprise: rearranging the image sequence by:
    receiving a user input for moving a first image to an alternative position in the image sequence;
    modifying the image sequence to associate a first reference to the first image with the alternative position; and
    modifying the image sequence to shift references to other images appearing before the alternative position.

3. The computer-implemented system of claim 1, wherein the operations further comprise: toggling one or more images of the set of images between a plurality of states by:
    receiving user input generated in response to a user interacting with one or more user interface elements.

4. The computer-implemented system of claim 1, wherein the operations further comprise: toggling one or more images of the set of images between a plurality of states, wherein the plurality of states are configured to prevent a subset of the set of images from being accessible by the plurality of networked systems.

5. The computer-implemented system of claim 1, wherein the operations further comprise: cropping one or more portions of the set of images-by:

iterating through the set of images to:
  receive a first selection of a first position and a second selection of a second position in an image;
  display a first line through the first position and a second line through the second position;
    identify a first area between the first line and the second line of the image;
    remove the first area from the image; and
    merge remaining areas of the image.

6. The computer-implemented system of claim 5,
wherein the first position and the second position are different from each other;
wherein the first line extends from a first boundary of the image to a second boundary of the image in a first direction that is parallel to a length or a width of the image, wherein the first boundary and the second boundary are on opposite sides of the image;
wherein the second line extends in the first direction from the first boundary to the second boundary; and
wherein identifying the area further comprises selecting the area of the image between the first line and the second line.

7. The computer-implemented system of claim 5, wherein iterating through the set of images is further configured to:
  receive a third selection of a third position in the image;
  receive a fourth selection of a fourth position in the image, the third position and the fourth position being different from each other;
  display a third line extending in the first direction from the first boundary to the second boundary through the third position;
  display a fourth line extending in the first direction from the first boundary to the second boundary through the fourth position; and
  remove a second area of the image between the third line and the fourth line.

8. The computer-implemented system of claim 1, wherein the operations further comprise: replacing a second subset of images with one or more new images by:
  identifying the second subset of images that are unacceptable;
  transmitting a signal to a first networked system associated with the second subset of images to request the one or more new images;
  receiving the one or more new images from the first networked system;
  replacing, in the database, the second subset of images with the one or more new images; and
  updating the image sequence to replace references to the second subset of images with references to the one or more new images.

9. The computer-implemented system of claim 8, wherein identifying the second subset of images comprises at least one of receiving a user input or using an image recognition algorithm.

10. A computer-implemented method for efficient management and modification of images, the method comprising:
  receiving one or more product data comprising an image sequence for displaying a set of images associated with a plurality of products;
  removing a first subset of images from the image sequence by:
    iterating through one or more references to the set of images in the image sequence;
    identifying one or more empty references corresponding to the first subset of images;
    displaying a notification that the empty references are found; and
    removing the empty references in the image sequence; and
  making the set of images accessible by a plurality of networked systems according to the one or more product data.

11. The computer-implemented method of claim 10, further comprising: rearranging the image sequence by:
  receiving a user input for moving a first image to an alternative position in the image sequence;
  modifying the image sequence to associate a first reference to the first image with the alternative position; and
  modifying the image sequence to shift references to other images appearing before the alternative position.

12. The computer-implemented method of claim 10, further comprising: toggling one or more images of the set of images between a plurality of states by:
  receiving user input generated in response to a user interacting with one or more user interface elements.

13. The computer-implemented method of claim 10, further comprising: toggling one or more images of the set of images between a plurality of states, wherein the plurality of states are configured to prevent a subset of the set of images from being accessible by the plurality of networked systems.

14. The computer-implemented method of claim 10, further comprising: cropping one or more portions of the set of images by:
  iterating through the set of images to:
    receive a first selection of a first position and a second selection of a second position in an image;
    display a first line through the first position and a second line through the second position;
    identify a first area between the first line and the second line of the image;
    remove the first area from the image; and
    merge remaining areas of the image.

15. The computer-implemented method of claim 14,
wherein the first position and the second position are different from each other;
wherein the first line extends from a first boundary of the image to a second boundary of the image in a first direction that is parallel to a length or a width of the image, wherein the first boundary and the second boundary are on opposite sides of the image;
wherein the second line extends in the first direction from the first boundary to the second boundary; and
wherein identifying the area further comprises selecting the area of the image between the first line and the second line.

16. The computer-implemented method of claim 14, wherein iterating through the set of images is further configured to:
  receive a third selection of a third position in the image;
  receive a fourth selection of a fourth position in the image, the third position and the fourth position being different from each other;
  display a third line extending in the first direction from the first boundary to the second boundary through the third position;
  display a fourth line extending in the first direction from the first boundary to the second boundary through the fourth position; and
  remove a second area of the image between the third line and the fourth line.

17. The computer-implemented method of claim 10, further comprising: replacing a second subset of images with one or more new images by:
- identifying the second subset of images that are unacceptable;
- transmitting a signal to a first networked system associated with the second subset of images to request the one or more new images;
- receiving the one or more new images from the first networked system;
- replacing, in the database, the second subset of images with the one or more new images; and
- updating the image sequence to replace references to the second subset of images with references to the one or more new images.

18. A computer-implemented system for efficient management and modification of images, the system comprising:
- a database;
- at least one non-transitory computer-readable medium configured to store instructions; and
- at least one processor configured to execute the instructions to perform operations comprising:
    - receiving a set of images from a second system connected to the processor over a network interface;
    - receiving an image sequence comprising references to the images in the set of images and an order of appearance;
    - storing the set of images and the image sequence in the database;
    - modifying the set of images and the image sequence in response to one or more user input generated by interactions with one or more user interface elements, the user input configured to remove a first subset of images from the image sequence by:
        - iterating through one or more references to the set of images in the image sequence;
        - identifying one or more empty references corresponding to the first subset of images;
        - displaying a notification that the empty references are found; and
        - removing the empty references in the image sequence; and
    - making the set of images accessible by a plurality of networked systems in the order specified by the image sequence.

* * * * *